(12) United States Patent
Angell et al.

(10) Patent No.: US 8,749,570 B2
(45) Date of Patent: Jun. 10, 2014

(54) IDENTIFYING AND GENERATING COLOR AND TEXTURE VIDEO COHORTS BASED ON VIDEO INPUT

(75) Inventors: Robert Lee Angell, Salt Lake City, UT (US); Robert R Friedlander, Southbury, CT (US); James R Kraemer, Santa Fe, NM (US); Sergio Borger, Demarest, NJ (US); Yashodhara M. Patnaik, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 12/333,273

(22) Filed: Dec. 11, 2008

(65) Prior Publication Data

US 2010/0150457 A1    Jun. 17, 2010

(51) Int. Cl.
*G09G 5/00* (2006.01)

(52) U.S. Cl.
USPC ........... 345/582; 345/419; 345/418; 382/103; 382/104; 382/115; 382/173; 382/224; 348/134; 348/143; 348/148; 348/166; 348/170

(58) Field of Classification Search
USPC .......... 345/419, 418, 582; 382/103, 104, 107, 382/115, 173, 197, 224, 228; 348/134, 135, 348/143, 148, 149, 150, 166, 169, 170, 172
See application file for complete search history.

(56) References Cited

U.S. PATENT DOCUMENTS

| | | | |
|---|---|---|---|
| 4,742,388 A * | 5/1988 | Cooper et al. ................... | 348/71 |
| 5,664,109 A | 9/1997 | Johnson et al. | |
| 5,774,569 A | 6/1998 | Waldenmaier | |
| 6,054,928 A | 4/2000 | Lemelson et al. | |
| 6,119,096 A | 9/2000 | Mann et al. | |
| 6,178,141 B1 | 1/2001 | Duckworth et al. | |
| 6,242,186 B1 | 6/2001 | Salonen | |
| 6,553,336 B1 | 4/2003 | Johnson et al. | |
| 6,646,676 B1 | 11/2003 | DaGraca et al. | |
| 6,795,808 B1 | 9/2004 | Strubbe et al. | |
| 7,308,385 B2 | 12/2007 | Wegerich et al. | |

(Continued)

FOREIGN PATENT DOCUMENTS

KR    20080082924 A    9/2008

OTHER PUBLICATIONS

Graham Center One-Pager, Types of Medical Errors Commonly Reported by Family Physicians, Am Fam Physician, Feb. 2003.

(Continued)

*Primary Examiner* — James A Thompson
*Assistant Examiner* — Abderrahim Merouan
(74) *Attorney, Agent, or Firm* — John R. Pivnichny; Law Office of Jim Boice

(57) ABSTRACT

A computer implemented method, apparatus, and computer program product for generating video based cohorts. Digital video data is processed to identify a set of color and texture based attributes associated with the set of objects. The digital video data comprises metadata describing the set of objects. The set of color and texture based attributes are analyzed using cohort criteria to form a result. The cohort criteria specify attributes that are associated with members of a given cohort. A set of cohorts is generated based on the result. Each cohort in the set of cohorts comprises a subset of objects from the set of objects that share at least one color and texture based attribute in common.

14 Claims, 5 Drawing Sheets

(56) References Cited

U.S. PATENT DOCUMENTS

| | | | |
|---|---|---|---|
| 7,363,309 B1 | 4/2008 | Waite et al. | |
| 7,538,658 B2 | 5/2009 | Twitchell | |
| 7,548,874 B2 | 6/2009 | Kanevsky et al. | |
| 7,584,280 B2 | 9/2009 | Kim et al. | |
| 7,634,109 B2* | 12/2009 | Steinberg et al. | 382/103 |
| 7,667,596 B2 | 2/2010 | Ozdemir et al. | |
| 7,683,929 B2 | 3/2010 | Elazar et al. | |
| 7,755,480 B2 | 7/2010 | Aritsuka et al. | |
| 7,840,515 B2 | 11/2010 | Ozdemir et al. | |
| 7,840,897 B2 | 11/2010 | Ancier | |
| 7,846,020 B2 | 12/2010 | Walker et al. | |
| 7,921,036 B1* | 4/2011 | Sharma et al. | 705/14.66 |
| 7,930,204 B1 | 4/2011 | Sharma et al. | |
| 7,953,686 B2 | 5/2011 | Angell et al. | |
| 7,974,869 B1 | 7/2011 | Sharma et al. | |
| 8,000,777 B2* | 8/2011 | Jaeb et al. | 600/476 |
| 2002/0176604 A1 | 11/2002 | Shekhar et al. | |
| 2002/0183971 A1 | 12/2002 | Wegerich et al. | |
| 2002/0194117 A1 | 12/2002 | Nabe et al. | |
| 2003/0023612 A1 | 1/2003 | Carlbom et al. | |
| 2003/0036903 A1 | 2/2003 | Konopka et al. | |
| 2003/0088463 A1* | 5/2003 | Kanevsky et al. | 705/14 |
| 2003/0131362 A1 | 7/2003 | Jasinschi et al. | |
| 2003/0169907 A1 | 9/2003 | Edwards et al. | |
| 2003/0174773 A1* | 9/2003 | Comaniciu et al. | 375/240.08 |
| 2003/0231769 A1* | 12/2003 | Bolle et al. | 380/210 |
| 2004/0064341 A1 | 4/2004 | Langan et al. | |
| 2004/0095617 A1* | 5/2004 | Mangerson | 358/484 |
| 2004/0161133 A1* | 8/2004 | Elazar et al. | 382/115 |
| 2004/0174597 A1 | 9/2004 | Craig et al. | |
| 2004/0181376 A1 | 9/2004 | Fables et al. | |
| 2004/0225202 A1 | 11/2004 | Skinner | |
| 2004/0240542 A1* | 12/2004 | Yeredor et al. | 375/240.01 |
| 2004/0249650 A1 | 12/2004 | Freedman et al. | |
| 2005/0018861 A1 | 1/2005 | Tashev | |
| 2005/0043060 A1 | 2/2005 | Brandenberg et al. | |
| 2005/0125325 A1 | 6/2005 | Chai et al. | |
| 2005/0169367 A1* | 8/2005 | Venetianer et al. | 375/240.01 |
| 2005/0187437 A1 | 8/2005 | Matsugu et al. | |
| 2005/0216273 A1 | 9/2005 | Reding et al. | |
| 2006/0000420 A1 | 1/2006 | Davies | |
| 2006/0004582 A1 | 1/2006 | Claudatos et al. | |
| 2006/0111961 A1 | 5/2006 | McQuivey | |
| 2006/0206379 A1 | 9/2006 | Rosenberg | |
| 2006/0251339 A1* | 11/2006 | Gokturk et al. | 382/305 |
| 2007/0013776 A1* | 1/2007 | Venetianer et al. | 348/143 |
| 2007/0122003 A1 | 5/2007 | Dobkin et al. | |
| 2007/0225577 A1 | 9/2007 | Mathan | |
| 2007/0230270 A1 | 10/2007 | Calhoun | |
| 2008/0004793 A1 | 1/2008 | Horvitz et al. | |
| 2008/0004951 A1 | 1/2008 | Huang et al. | |
| 2008/0024299 A1 | 1/2008 | Robertson | |
| 2008/0031491 A1 | 2/2008 | Ma et al. | |
| 2008/0055049 A1 | 3/2008 | Weill et al. | |
| 2008/0067244 A1* | 3/2008 | Marks | 235/385 |
| 2008/0071162 A1* | 3/2008 | Jaeb et al. | 600/407 |
| 2008/0082399 A1 | 4/2008 | Noble et al. | |
| 2008/0092245 A1 | 4/2008 | Alward et al. | |
| 2008/0098456 A1 | 4/2008 | Alward et al. | |
| 2008/0109398 A1 | 5/2008 | Harter | |
| 2008/0228577 A1 | 9/2008 | Decre et al. | |
| 2008/0240496 A1* | 10/2008 | Senior | 382/103 |
| 2008/0243439 A1 | 10/2008 | Runkle et al. | |
| 2008/0260212 A1 | 10/2008 | Moskal et al. | |
| 2008/0262743 A1 | 10/2008 | Lewis et al. | |
| 2008/0306895 A1* | 12/2008 | Karty | 706/52 |
| 2009/0002155 A1 | 1/2009 | Ma et al. | |
| 2009/0070138 A1 | 3/2009 | Langheier et al. | |
| 2009/0092283 A1 | 4/2009 | Whillock et al. | |
| 2009/0109795 A1 | 4/2009 | Marti | |
| 2009/0164302 A1* | 6/2009 | Jung et al. | 705/10 |
| 2009/0171783 A1* | 7/2009 | Raju | 705/14 |
| 2009/0185723 A1 | 7/2009 | Kurtz et al. | |
| 2009/0195401 A1 | 8/2009 | Maroney et al. | |
| 2009/0231436 A1* | 9/2009 | Faltesek et al. | 348/169 |
| 2010/0008515 A1 | 1/2010 | Fulton et al. | |
| 2010/0131206 A1 | 5/2010 | Angell et al. | |
| 2010/0131263 A1 | 5/2010 | Angell et al. | |
| 2010/0131502 A1 | 5/2010 | Fordham | |
| 2010/0148970 A1 | 6/2010 | Angell et al. | |
| 2010/0150457 A1 | 6/2010 | Angell et al. | |
| 2010/0150458 A1 | 6/2010 | Angell et al. | |
| 2010/0153146 A1 | 6/2010 | Angell et al. | |
| 2010/0153147 A1 | 6/2010 | Angell et al. | |
| 2010/0153174 A1 | 6/2010 | Angell et al. | |
| 2010/0153180 A1 | 6/2010 | Angell et al. | |
| 2010/0153353 A1 | 6/2010 | Angell et al. | |
| 2010/0153389 A1 | 6/2010 | Angell et al. | |
| 2010/0153390 A1 | 6/2010 | Angell et al. | |
| 2010/0153458 A1 | 6/2010 | Angell et al. | |
| 2010/0153470 A1 | 6/2010 | Angell et al. | |
| 2010/0153597 A1 | 6/2010 | Angell et al. | |
| 2010/0177169 A1* | 7/2010 | Saric | 348/51 |
| 2010/0207874 A1 | 8/2010 | Yuxin et al. | |

OTHER PUBLICATIONS

M. Borg et al., "Video Surveillance for Aircraft Activity Monitoring", IEEE Conference on Advanced Video and Signal Based Surveillance, 2005, pp. 16-21.

Y. Matsushita et al., "Illumination Normalization With Time-Dependent Intrinsic Images for Video Surveillance", IEEE Transactions on Pattern Analysis and Machine Intelligence, vol. 26, Issue 10, Oct. 2004, pp. 1336-1347.

J. Davis et al., "An Adaptive Focus-of-Attention Model for Video Surveillance and Monitoring", Machine Vision and Application 18, 2007, pp. 41-64.

L. Herbert, "Othello Error: Facial Profiling, Privacy, and the Suppression of Dissent", Ohio State Journal of Criminal Law, vol. 5, 2007, pp. 79-129.

C. Larson et al., "The Shape of Threat: Simple Geometric Forms Evoke Rapid and Sustained Capture of Attention", Emotion 2007, vol. 7, No. 3, pp. 526-534.

A. Oredsson, "Cognitive Video Surveillance: An ANN/CBR Hybrid Approach", Master of Science in Informatics, Norwegian University of Science and Technology, Submitted Jun. 2007, pp. 1-136.

N. Siebel et al., "The Advisor Visual Surveillance System", Applications of Computer Vision'04, Prague, May 16, 2004, pp. 103-111.

U.S. Appl. No. 12/333,326, filed Dec. 12, 2008, Angell et al.

Brown et al., "IBM Smart Surveillance System (S3): An Open and Extensible Architecture for Smart Video Surveillance", Retrieved on Jan. 12, 2009, pp. 1-4.

U.S. Appl. No. 12/275,830—Non-Final Office Action Mailed Dec. 14, 2011.

U.S. Appl. No. 12/335,521—Final Office Action Mailed Dec. 30, 2011.

Yalch et al., "The Effects of Music in a Retail Setting on Real and Perceived Shopping Times," Journal of Business Research 49, pp. 139-147, 2000.

U.S. Appl. No. 12/333,319—Final Office Action Mailed Feb. 1, 2012.

Gulas et al., "Right Under Our Noses: Ambient Scent and Consumer Responses," Journal of Business and Psychology, Fall 1995.

M. Bitner, "The Impact of Physical Surroundings on Customer and Employees," Journal of Marketing, Apr. 1992.

Knowledge@Wharton, Tag Team, "Tracking the Pattern of Supermarket Shoppers," Published Jun. 1, 2005.

Girgensohn et al., "Determining Activity Patterns in Retail Spaces Through Video Analysis," MM'08, Oct. 26-31, 2008.

U.S. Appl. No. 12/333,311, Angell et al., Final Office Action Mailed Aug. 18, 2011.

U.S. Appl. No. 12/333,316, Angell et al., Non-Final Office Action Mailed Sep. 6, 2011.

U.S. Appl. No. 12/336,488, Angell et al., Non-Final Office Action Mailed Sep. 15, 2011.

U.S. Appl. No. 12/335,731, Angell et al., Non-Final Office Action Mailed Oct. 26, 2011.

U.S. Appl. No. 12/335,857, Angell et al., Final Office Action Mailed Oct. 13, 2011.

(56) References Cited

OTHER PUBLICATIONS

U.S. Appl. No. 12/333,323, Angell et al., Notice of Allowance Mailed Nov. 15, 2011.
Lymberopoulos et al., "An Easy-To-Program Sensor System for Parsing Out Human Activities," Embedded Networks and Applications Lab, Enalab, Yale University, New Haven, CT, 2008, pp. 1-17.
U.S. Appl. No. 12/336,471, Angell et al., Non-Final Office Action Mailed Nov. 17, 2011.
U.S. Appl. No. 12/275,830, Angell et al., Specification filed Nov. 21, 2008.
U.S. Appl. No. 12/277,122, Angell et al., Non-Final Office Action Mailed May 10, 2011.
U.S. Appl. No. 12/277,122, Angell et al., Specification filed Nov. 24, 2008.
U.S. Appl. No. 12/333,256, Angell et al., Specification filed Dec. 11, 2008.
U.S. Appl. No. 12/333,256, Angell et al., Non-Final Office Action Mailed May 23, 2011.
U.S. Appl. No. 12/336,488, Angell et al., Specification filed Dec. 16, 2008.
U.S. Appl. No. 12/333,311, Angell et al., Specification filed Dec. 12, 2008.
U.S. Appl. No. 12/333,311, Angell et al., Non-Final Office Action Mailed Feb. 28, 2011.
U.S. Appl. No. 12/333,316, Angell et al., Specification filed Dec. 12, 2008.
U.S. Appl. No. 12/333,319, Angell et al., Specification filed Dec. 12, 2008.
U.S. Appl. No. 12/333,319, Angell et al., Non-Final Office Action Mailed Jun. 21, 2011.
U.S. Appl. No. 12/333,321, Angell et al., Specification filed Dec. 12, 2008.
U.S. Appl. No. 12/333,321, Angell et al., Non-Final Office Action Mailed May 23, 2011.
U.S. Appl. No. 12/333,323, Angell et al., Specification filed Dec. 12, 2008.
U.S. Appl. No. 12/335,857, Angell et al., Specification filed Dec. 16, 2008.
U.S. Appl. No. 12/335,857, Angell et al., Non-Final Office Action Mailed Feb. 3, 2011.
U.S. Appl. No. 12/335,521, Angell et al., Specification filed Dec. 15, 2008.
U.S. Appl. No. 12/335,521, Angell et al., Non-Final Office Action Mailed Jun. 27, 2011.
U.S. Appl. No. 12/335,731, Angell et al., Specification filed Dec. 16, 2008.
U.S. Appl. No. 12/336,440, Angell et al., Specification filed Dec. 16, 2008.
U.S. Appl. No. 12/336,440, Angell et al., Non-Final Office Action Mailed Jul. 21, 2011.
U.S. Appl. No. 12/336,471, Angell et al., Specification filed Dec. 16, 2008.
U.S. Appl. No. 12/333,311—Final Office Action Mailed Jun. 1, 2012.
U.S. Appl. No. 12/275,830—Notice of Allowance Mailed Jun. 25, 2012.
U.S. Appl. No. 12/336,488—Examiner's Answer Mailed Oct. 25, 2012.
U.S. Appl. No. 13/605,248—Non-Final Office Action Mailed Nov. 19, 2012.
U.S. Appl. No. 12/336,440—Examiner's Answer Mailed Nov. 23, 2012.
U.S. Appl. No. 12/333,321—Non-Final Office Action Mailed Dec. 19, 2012.
B. Welsh et al., "Effects of Improved Street Lighting on Crime," Sep. 24, 2008, Campbell Systematic Reviews. The Campbell Collaboration, pp. 1-54.
U.S. Appl. No. 12/336,440—Final Office Action Mailed Feb. 27, 2012.
U.S. Appl. No. 12/336,488—Final Office Action Mailed Mar. 9, 2012.
U.S. Appl. No. 12/335,521—Examiner's Answer Mailed Apr. 25, 2012.
U.S. Appl. No. 12/335,857—Examiner's Answer Mailed Mar. 15, 2012.
U.S. Appl. No. 12/333,326—Non-Final Office Action Mailed May 16, 2012.
U.S. Appl. No. 12/333,311—Non-Final Office Action Mailed Jan. 24, 2012.
U.S. Appl. No. 12/333,256—Non-Final Office Action Mailed Feb. 14, 2013.
U.S. Appl. No. 12/336,471—Notice of Allowance Mailed Mar. 21, 2013.
U.S. Appl. No. 13/605,248—Final Office Action Mailed Apr. 26, 2013.
U.S. Appl. No. 12/333,256—Final Office Action Mailed Jun. 26, 2013.
U.S. Appl. No. 12/333,321—Final Office Action Mailed Jun. 3, 2013.
U.S. Appl. No. 12/333,311—Non-Final Office Action Mailed Oct. 1, 2013.
U.S. Appl. No. 13/605,248—Notice of Allowance Mailed Aug. 26, 2013.
U.S. Appl. No. 12/333,321—Examiner's Answer Mailed Sep. 25, 2013.

\* cited by examiner

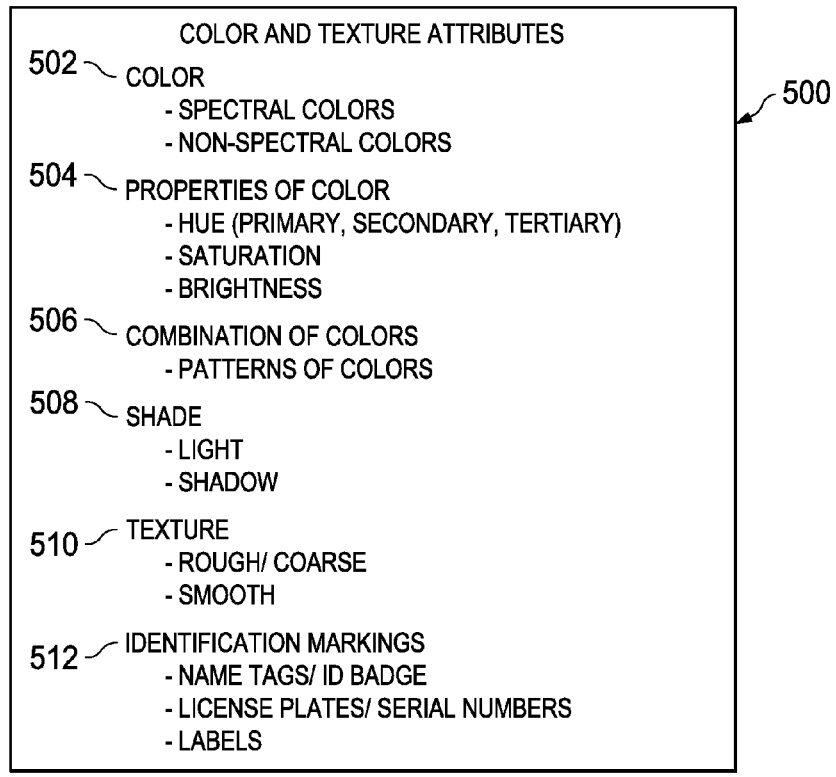
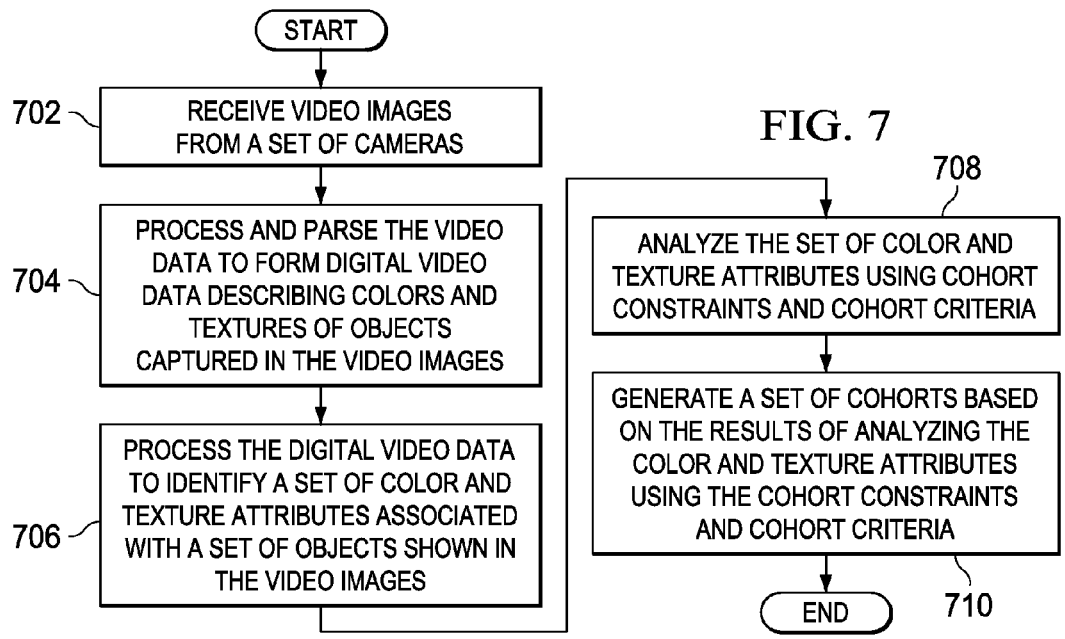

IDENTIFYING AND GENERATING COLOR AND TEXTURE VIDEO COHORTS BASED ON VIDEO INPUT

BACKGROUND OF THE INVENTION

1. Field of the Invention

The present invention relates generally to an improved data processing system and in particular to a method and apparatus for generating cohorts. More particularly, the present invention is directed to a computer implemented method, apparatus, and computer usable program code for processing digital video input to generate video based cohorts.

2. Description of the Related Art

A cohort is a group of objects that share a common attribute or experience. For example, a group of people born in 1980 may form a birth cohort. The information that is needed or wanted to identify attributes of potential members of a cohort may be voluminous, dynamically changing, unavailable, difficult to collect, and/or unknown to the member of the cohort and/or the user selecting members of a cohort. Moreover, it may be difficult, time consuming, or impractical for an individual to access all the information necessary to accurately generate cohorts. Thus, unique cohorts may be sub-optimal because individuals lack the skills, time, knowledge, and/or expertise needed to gather cohort attribute information from available sources.

Moreover, information distinguishing different colors of objects is frequently useful in a variety of fields. For example, it may be important to distinguish between a red warning light and a green warning light to determine the severity of a potential problem. A human using the sense of sight to identify different colors may perform color identification. However, this method is limited by the human ability to perceive and identify different color hues. In another method, some color identification software tools may be used to identify colors in digital images.

BRIEF SUMMARY OF THE INVENTION

According to one embodiment of the present invention, a computer implemented method, apparatus, and computer program product for generating video based cohorts is provided. A digital video analysis engine processes digital video data to identify a set of color and texture based attributes associated with the set of objects. The digital video data comprises metadata describing the set of objects. A cohort generation engine analyzes the set of color and texture based attributes using cohort criteria to form a result. The cohort criteria specify attributes that are associated with members of a given cohort. The cohort generation engine generates a set of cohorts based on the result. Each cohort in the set of cohorts comprises a subset of objects from the set of objects that share at least one color and texture based attribute in common.

BRIEF DESCRIPTION OF THE SEVERAL VIEWS OF THE DRAWINGS

FIG. 5 is a block diagram of color and texture attributes generated based on results of processing digital video data in accordance with an illustrative embodiment;

FIG. 7 is a flowchart of a process for generating video based cohorts using color and texture attributes in accordance with an illustrative embodiment.

DETAILED DESCRIPTION OF THE INVENTION

Figure 1:
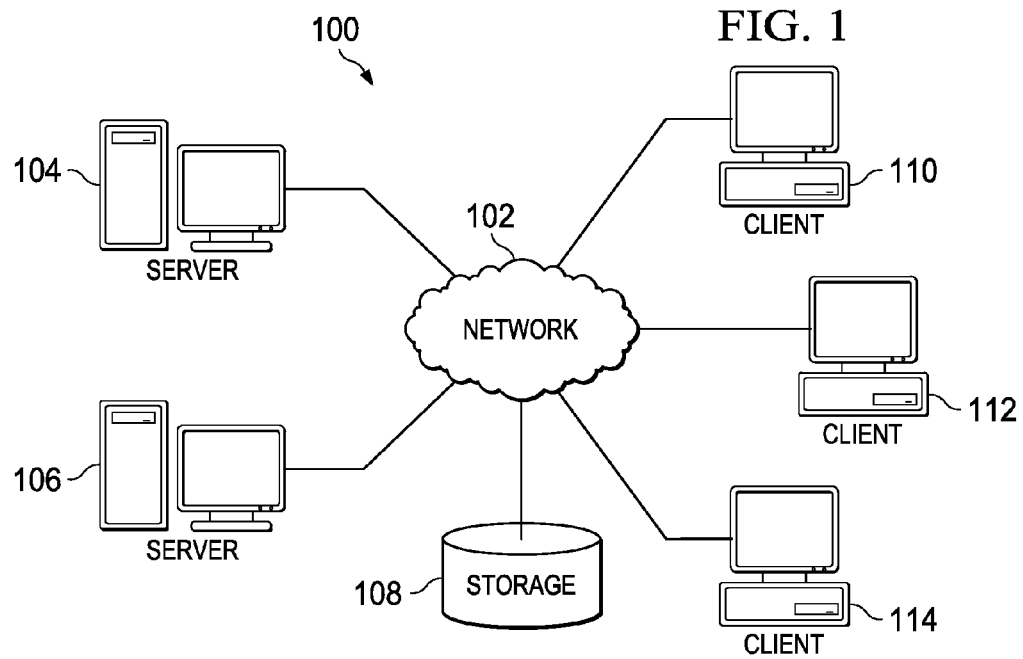
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
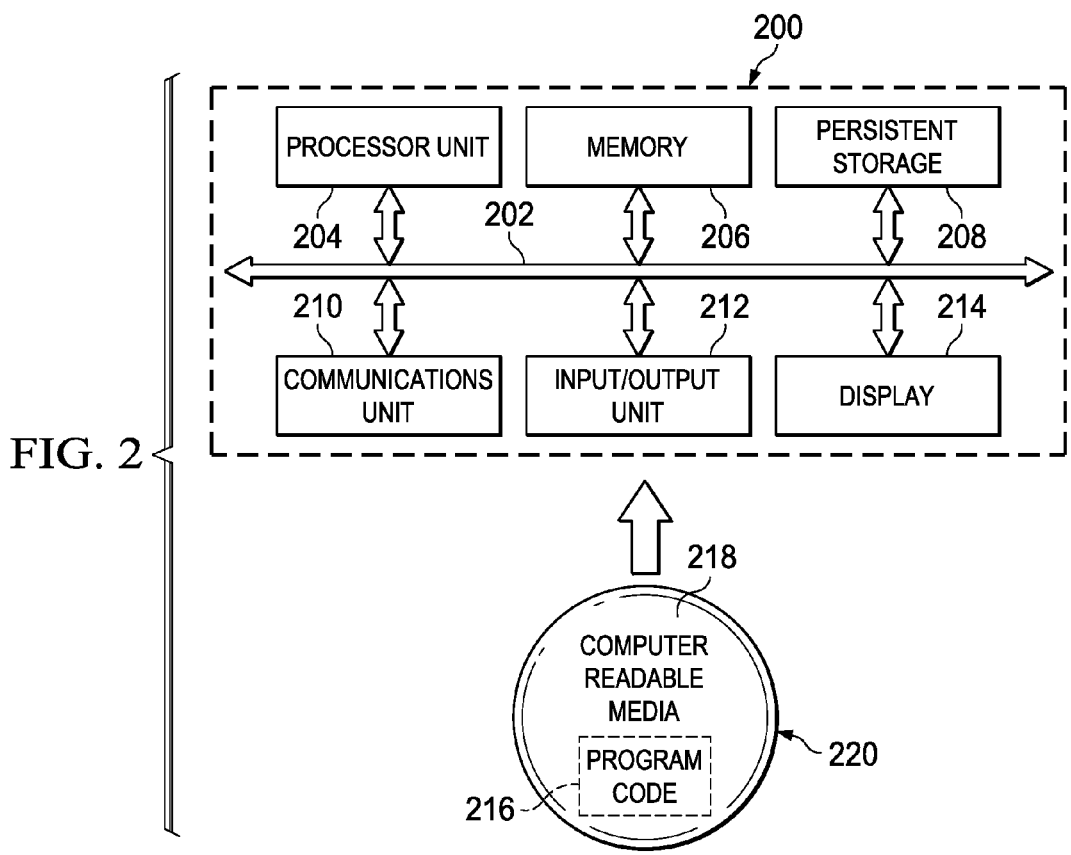
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as, without limitation, server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (IPO) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A cohort is a group of people, animals, plants, places, or objects that share a common attribute or experience. For example, a group of people born in 1980 may form a birth cohort. A cohort may include one or more sub-cohorts. For example, the birth cohort of people born in 1980 may include a sub-cohort of people born in 1980 in Salt Lake City, Utah. A sub-subcohort may include people born in 1980 in Salt Lake City, Utah to low income, single parent households.

A cohort is generated based on one or more attributes that members of the cohort share in common. The information used to identify the attributes of members of the cohort groups are typically provided by the members of the cohort groups. However, this information describing attributes and attributes of members of cohort groups may be voluminous, dynamically changing, unavailable, and/or unknown to the member of the cohort group and/or the user selecting members of a cohort group. Moreover, it may be difficult, time consuming, or impractical for an individual to access all the information necessary to accurately generate cohort groups. Moreover, unique cohort groups are typically sub-optimal because individuals lack the skills, time, knowledge, and/or expertise needed to gather cohort attribute information from available sources.

The illustrative embodiments recognize that there are many industries and professions, such as, without limitation, chemistry, research, and medicine, in which it may be desirable to be able to distinguish different colors, textures, and surface markings on objects in images generated by a camera. As used herein, an object may be a person, place, thing, animal, plant, place, or location. Color and texture identification may be performed manually by an individual using natural human sight and touch senses to distinguish colors, textures, and identifying markings. However, this technique is limited by the range of ability to "see" visible light and to distinguish different hues and shades of colors, due to the natural limitations of the human senses.

Currently, there are some color identification software tools available that may be used to identify colors in a digital image, such as, but without limitation, Pantone® Color Cue and the Pantone Matching System®. The illustrative embodiments recognize that information generated by these color identification software tools may be used to automatically identify colors associated with objects in an image to identify attributes of those objects. The embodiments also recognize that it would be beneficial to identify, automatically, the texture and surface markings associated with an object for utilization in generating cohorts. Cohort groups may be used in research, marketing, safety studies, and many other various uses.

Therefore, in one embodiment of the present invention, a computer implemented method, apparatus, and computer program product for generating video based cohorts using color and texture attributes is provided. In one embodiment, cohorts are generated and/or members of cohorts are selected based on information describing colors, textures, and surface markings associated with one or more objects in camera image(s).

A video based cohort is a group of objects that share one or more attributes, such as, without limitation, color and/or texture attributes, identified using images of one or more objects. In one embodiment, images are received from a set of cameras. As used herein, the term "set" refers to one or more, unless specifically defined otherwise. Thus, the set of cameras is a set of one or more cameras. A camera may be implemented using a still image camera, a video camera, a stationary camera, a mobile camera, such as a camera mounted on a mobile robot, a camera phone, a panoramic (wide-angle) camera, a Polaroid, a digital camera, a web camera, or any other device capable of capturing an image of an object.

A digital video analysis engine receives the video data from the set of cameras. The video data comprises a set of images of one or more objects. The images are generated by the set of cameras. The images may be static images or a stream of moving images. The digital video analysis engine utilizes video analysis software tools to convert the images into digital video data that is compatible with the cohort generation engine. The digital video data comprises metadata, which describes objects in the camera images captured by the set of cameras.

The digital video analysis engine analyzes the digital video data with the metadata to identify color and texture attributes of objects. A color and texture attribute is a characteristic, feature, or other property of an object associated with a color, color combination, color pattern, color property, texture, surface marking, light, shadow, or other feature of a surface of an object as captured by a camera.

A set of video based cohorts are generated using the attributes described in the metadata in the digital video data. The set of video based cohorts may comprise a single cohort, as well as two or more cohorts. A video based cohort group may have any number of members from a null set to an infinite number of members. In other words, a video based cohort may have no members, a single member, or two or more members that share a common attribute. A member of a video based cohort group may include a human, animal, plant, place, location, or object. In one embodiment, the video based cohort may be used in a system wide monitoring process to quickly and efficiently pass vital information to a real-time computational process. Thus, the embodiments permit a user to create cohort groups based on video based attributes, such as color, texture, surface markings, light and shade, and other surface appearance attributes of one or more objects in a particular area or environment.

For example, and without limitation, a user may wish to identify every customer in a shopping mall that is wearing a pink article of clothing, such as pink hats or pink shirts. In such a case, the digital video analysis engine may analyze digital video data to identify customers that are wearing pink hats. A cohort generation engine may then use the color attribute data for the customers to select customers wearing pink as members of a first cohort of customers wearing pink hats and a second cohort of customers wearing hats that are not pink. Identifying colors worn by customers may be useful for various purposes, such as, without limitation, marketing studies, advertising, planning future production, targeted advertising, and various other industries. These cohort groups provide an effective tool for automatically creating cohort groups based on attributes of objects identified by a software digital video analysis of camera images without the intervention of a human user.

Figure 3:
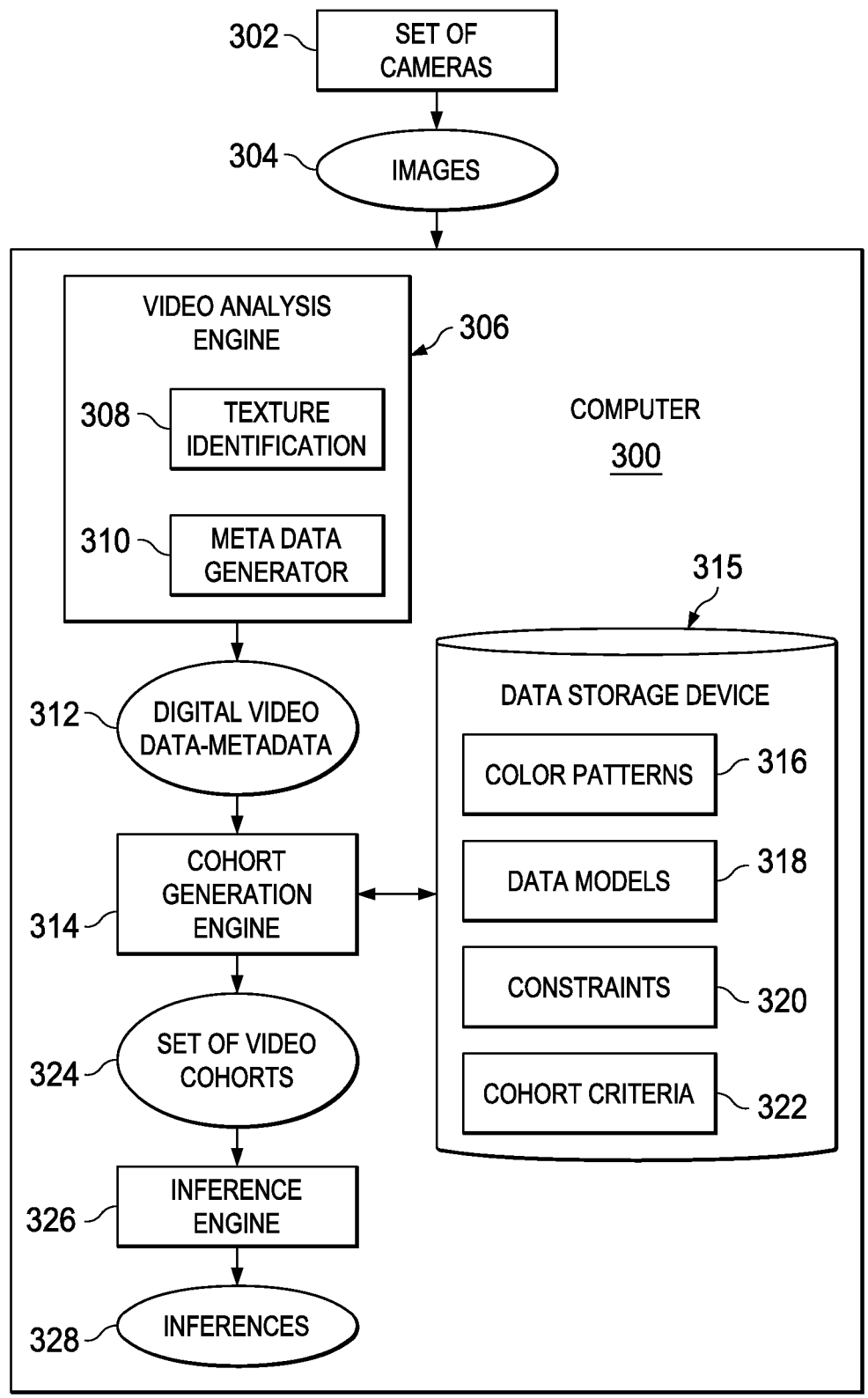
FIG. 3 is a block diagram of a digital video analysis system in accordance with an illustrative embodiment.

FIG. 3 is a block diagram of a digital video analysis system in accordance with an illustrative embodiment. Computer 300 may be implemented using any type of computing device, such as, but not limited to, a main frame, server, a personal computer, laptop, personal digital assistant (PDA), or any other computing device depicted in FIGS. 1 and 2.

Set of cameras 302 generate camera images 304. Set of cameras 302 is a set of one or more cameras. In other words, images 304 may include only a single camera, as well as two or more cameras. Set of cameras 302 may be implemented as any type of known or available camera(s), including, but not limited to, a video camera for generating moving images, a digital camera capable of generating static (still) pictures and/or a moving images, a stereo camera, a web camera, and/or any other imaging device capable of generating images of objects.

Images 304 comprise one or more images of at least one object. Images 304 may be still camera images or a stream of moving images. Each image in images 304 is composed of picture elements (pixels). A pixel is the smallest discrete component of a camera image. Each pixel in each image includes pixel data. Video analysis engine 306 uses the pixel data in each camera image to identify size and shape attributes of objects in images 304. Video analysis engine 306 comprises software architecture for analyzing images 304 to form digital video data 312. Video analysis engine 306 comprises a set of video image analysis software tools for analyzing and parsing images 304 and generating digital video data 312 with metadata describing attributes of the objects in images 304.

Video analysis engine 306 may be implemented using any type of known or available color identification software, optical character recognition software, and/or license plate recognition software. In one embodiment, the digital video analysis engine may be implemented, using video analysis software tools such as, without limitation, IBM® smart surveillance system (S3) software. The license plate recognition technology catalogs a license plate of any vehicle within a camera image.

Video analysis engine 306 also comprises texture identification 308. Texture identification is a software component that analyzes images 304 and identifies textures of objects in images 304. Texture refers to the texture of an outer surface of an object, such as, without limitation, smooth, rough, or course. Texture identification 308 identifies a degree to which a surface is shiny or dull. Texture identification 308 analyzes the image of an object to identify a luminescence of the object. Texture identification 308 identifies a portion of an object as smooth texture if the surface of the object in the image is shiny with large variations in luminescence. Texture identification 308 identifies a portion of an object as having a rough texture if the surface of the object in the image is a surface with more uniform variations in luminescence.

Thus, video analysis engine 306 uses color identification software tools to identify the color on the surface of an object, and combinations of colors on the surface of the object by analyzing one or more images of the object. Video analysis engine 306 utilizes license plate recognition technology and optical character recognition to identify numbers, letters, and other markings on the surface of an object, such as, without limitation, words and numbers on clothing, a hat, a label, identification badge, street sign, address sign, bumper sticker, or license plate. Video analysis engine 306 uses texture identification 308 to determine whether the surface of an object is smooth or rough/coarse.

Digital video data 312 comprises metadata describing the color and/or texture attributes of the objects in images 304. Metadata generator 310 is a software component for generating the metadata describing the attributes, such as color, texture, surface markings, and patterns of colors on the surface of an object.

In one non-limiting example, digital video data 312 may be transmitted to cohort generation engine 314 as a digital wave file with the metadata. However, the embodiments are not limited to transmitting digital video data 312 as a digital wave file. Digital video data 312 may be transmitted using any known or available method for transferring or sending data to cohort generation engine 314.

Cohort generation engine 314 receives digital video data 312 from video analysis engine 306. Cohort generation engine 314 may also request digital video data 312 from a data storage device where digital video data 312 is stored until it is needed, such as data storage device 315. Data storage device 315 may be implemented using any type of data storage device, such as, without limitation, storage 108 in FIG. 1.

In one embodiment, video analysis engine 306 automatically sends digital video data 312 to cohort generation engine 314 in real time as digital video data 312 is generated. In yet another embodiment, video analysis engine 306 sends digital video data 312 to cohort generation engine 314 upon the occurrence of a predetermined event. A predetermined event may be, without limitation, a given time, completion of processing images 304, occurrence of a timeout event, a user request for generation of set of video cohorts 324 based on color and texture attributes identified using digital video data 312, or any other predetermined event. Thus, the illustrative embodiments may utilize digital video data 312 in real time as digital video data 312 is generated or utilize digital video data that is pre-generated or stored in a data storage device until digital video data 312 is retrieved at some later time.

Cohort generation engine 314 analyzes digital video data 312 using color patterns 316, data models 318, cohort constraints 320, and/or cohort criteria 322 to generate set of video cohorts 324. Cohort generation engine 314 generates set of video cohorts 324 based on video based attributes in digital video data 312, such as color and texture attributes. Set of video cohorts 324 may include one or more video based cohorts. Each cohort group in set of video cohorts 324 may have a null set of members, a single member, as well as two or more members.

Color patterns 316 is an index or lookup table of known color patterns. A color pattern is a pattern of data that describes a color pattern or combination of colors in a particular layout or design. For example, the red and white pattern of a Coca-Cola logo may be one known color pattern in color patterns 316 and the uniform brown color of a United Parcel Service (UPS) truck may be another color pattern in color patterns 316. Cohort generation engine 314 compares metadata describing color and texture attributes of object in images 304 with known color patterns 316 to identify a particular object, source of an object, label, surface markings, and other attributes of an object. A particular color or combination of colors identified with an object in a camera image is compared to known color patterns 316. If a match is found, the matching color pattern may be used to identify color and texture attributes of the object, an identity of the object, a source or manufacturer of the object, or other attributes.

Cohort generation engine 314 may optionally process digital video data 312 in data models 318. Data models 318 comprise a set of one or more data models for processing digital video data 312 and identifying attributes of objects. A data model is a model for structuring, defining, organizing, imposing limitations or constraints, and/or otherwise manipulating data and metadata to produce a result. A data model may be generated using any type of modeling method or simulation including, but not limited to, a statistical method, a data mining method, a causal model, a mathematical model, a marketing model, a behavioral model, a psychological model, a sociological model, or a simulation model.

In one embodiment, digital video data 312 is processed using one or more data models to create one or more video cohorts. For example, a data model may be used to identify customers in a department store that are wearing a particular sports jersey or clothing supporting a particular sports team. This information is used to create a cohort of customers wearing that particular sports related apparel. Another data model may be used to process the same digital video data 312 to create a cohort of customers that are not wearing that particular color.

A cohort may include one or more sub-cohorts. In this example, digital video data 312 may be processed in a data model to identify customers wearing sports related apparel and a sub-cohort of customers wearing sports related apparel for a particular team. This information may be useful, for example and without limitation, marketing research, targeted advertising, future product orders, and various other uses.

In one embodiment, cohort generation engine 314 generates the cohorts and sub-cohorts in set of video cohorts 324 using at least one of color patterns 316, data models 318, cohort constraints 320, and/or cohort criteria 322. The term "at least one" refers to one or more or any combination. Thus, cohorts may be generated using only color patterns 316, using only cohort criteria 322, using cohort constraints 320 and cohort criteria 322, using color patterns 316, data models 318, and cohort criteria 322, using color patterns 316, data models 318, constraints 320, and cohort criteria 322, or any other combination of color patterns 316, data models 318, constraints 320, and/or cohort criteria 322.

Cohort criteria 322 are a set of criteria and/or guidelines for generating set of video cohorts 324. Cohort criteria 322 specify attributes that are present or associated with members of a particular cohort. Cohort constraints 320 specify attributes that are absent or not associated with members of the particular cohort. For example, and without limitation, cohort criteria may specify that a particular cohort group should include all cars that are painted blue and cohort constraints may specify that members of the cohort of cars must not contain cars that are painted more than one color, such as a two tone paint job.

These video based cohorts may be used for a variety of uses, such as, without limitation, industrial, medical, health, safety, marketing, and research-related endeavors. The video cohorts may also be used as a set of methodologies to solve a variety of problems. In one embodiment, cohort generation engine 314 provides set of video cohorts 324 to inference engine 326. Inference engine 326 is a software component, such as a computer program, that derives inferences from a knowledge base. The knowledge base is a body of facts, criteria, factors, and other information used to generate one or more inferences 328. The knowledge base may be stored in one or more local data storage devices on computer 300, such as data storage device 315, and/or stored in one or more remote data storage devices that may be accessed over a network connection. Data storage device 315 is any type of device for storing data, such as, without limitation, storage 108 in FIG. 1.

In this example, inference engine 326 derives inferences 328 from set of video cohorts 324 and/or any other data available in the knowledge base. The data in the knowledge base may include data located in a database located locally on computer 300 as well as data located on one or more remote data storage devices that may be accessed using a network connection.

Inferences 328 are conclusions regarding possible future events or future changes in the attributes of cohort groups that are drawn or inferred based on the knowledge base and set of video cohorts 324. For example, and without limitation, set of video cohorts 324 may be analyzed by inference engine 326 to determine whether a particular color of clothing, such as pink hats, will continue to be trendy or popular in a given particular region or area. Inference engine 326 may also, without limitation, analyze set of video cohorts 324 to determine whether the particular color of clothing will become popular or trendy in a different region or area based on data describing people wearing that particular color of clothing in the given region or area. In another example, inference engine 326 may generate inferences regarding which customers are likely to purchase particular products based on cohorts of customers using those products.

In this embodiment, set of cameras 302 is implemented as a separate device than computer 300. However, in another embodiment, set of cameras 302 and video analysis engine 306 in computer 300 may be embodied within a single device.

Figure 4:
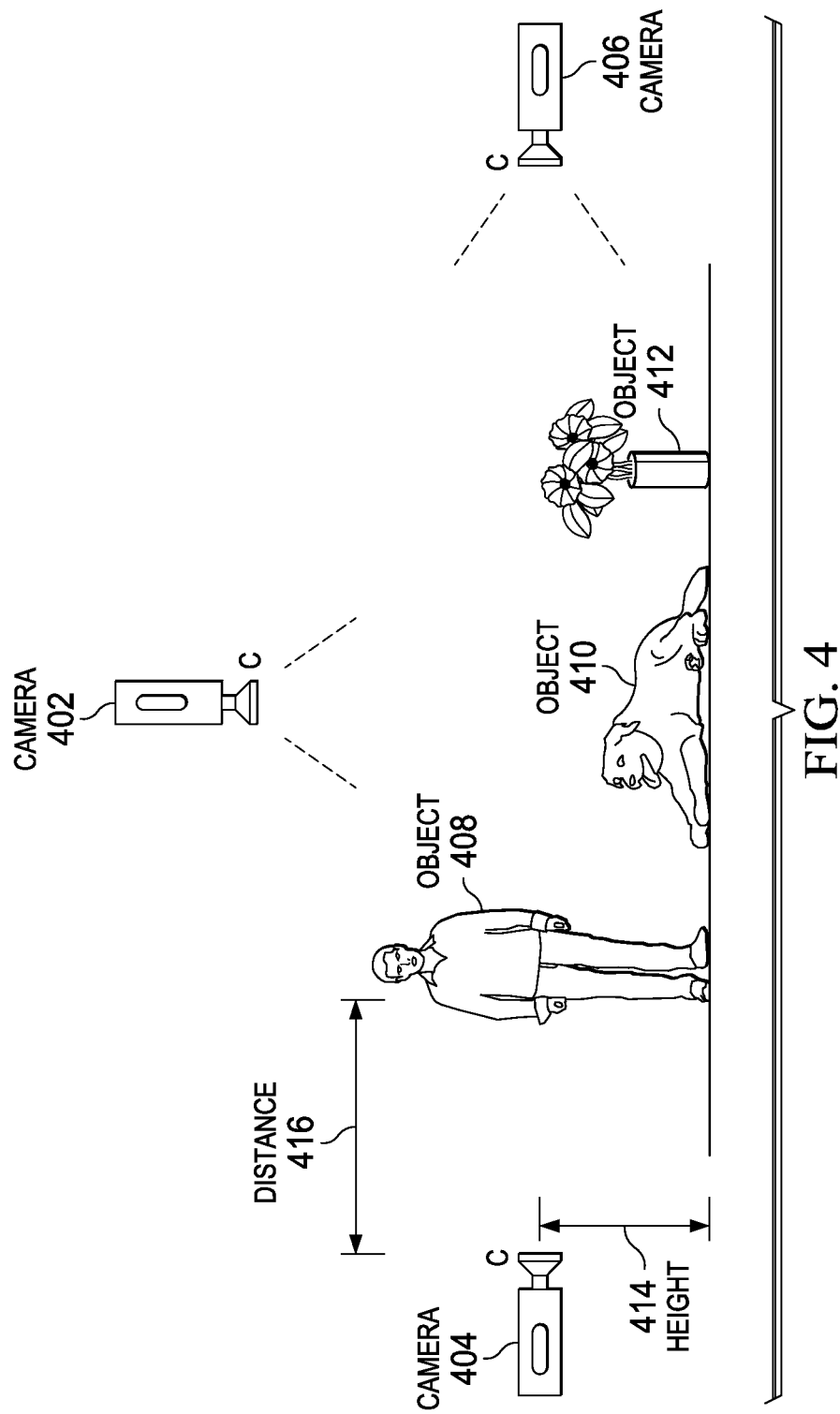
FIG. 4 is a block diagram of a set of cameras for capturing camera images in accordance with an illustrative embodiment.

Turning now to FIG. 4, a block diagram of a set of cameras for capturing camera images is shown in accordance with an illustrative embodiment. Cameras 402-406 is a set of cameras, such as set of cameras 302 in FIG. 3. Cameras 402-406 may be implemented as any type of known or available camera(s), including, but not limited to, a video camera for generating moving video images, a digital camera capable of taking still pictures and/or a continuous video stream, a stereo camera, a web camera, and/or any other imaging device capable of capturing a view of whatever appears within the camera's range for remote monitoring, viewing, or recording of an object or area.

Various lenses, filters, and other optical devices such as zoom lenses, wide-angle lenses, mirrors, prisms, and the like, may also be used with set of cameras 302 to assist in capturing the desired view. A camera in set of cameras 302 may be fixed in a particular orientation and configuration, or it may, along with any optical devices, be programmable in orientation, light sensitivity level, focus or other parameters. Programming data may be provided via a computing device, such as server 104 in FIG. 1.

Cameras 402-406 may be implemented as a stationary camera and/or non-stationary camera. A stationary camera is a camera is a fixed location. A non-stationary camera may be capable of moving from one location to another location. However, a both a stationary and non-stationary camera may be capable of tilting in one or more directions, such as up, down, left, right, and/or rotating about an axis of rotation. Thus, either a stationary or non-stationary camera may be capable of panning or rotating about an axis and/or tilting to follow or track a person, animal, or object in motion or keep a mobile object, such as, without limitation, a person, animal, or vehicle, within a viewing range of the camera lens. Cameras 402-406 may be, either directly or indirectly, coupled to and/or in communication with the video analysis engine. In addition, one or more of cameras 402-406 may be operated simultaneously to generate camera images and/or one or more of cameras 402-406 may be operated sporadically or in sequence to generate camera images.

Cameras 402-406 generate images of one or more objects, such as, without limitation, object 408, object 410, and object 412. In this example, the set of cameras includes three (3) cameras. However, the embodiments are not limited to three cameras in the configuration shown in FIG. 4. The embodiments may be implemented using any number of cameras in any possible configuration for generation images of objects. Likewise, cameras 402-406 are capturing images of objects, such as, without limitation, a person, a dog, and a crate. However, a set of cameras may be used to capture images of any type of objects, including, without limitation, humans, animals, plants, machines, vehicles, locations, places, buildings, sidewalks, roadways, or any other objects.

A video analysis engine analyzes the images generated by cameras 402-406 and identifies color and texture attributes of objects 408-412. For example, and without limitation, the video analysis engine may determine the color of the dog's fur, the color of the crate, the color of clothing worn by the person, distinguish between light and shadow falling on an object, the color of the person's hair, the color of the ground or floor that the person and the dog are standing on, and/or any other color and texture attributes of objects in the images generated by cameras 402-406.

In one embodiment, cameras 402-406 are calibrated to determine the location of each camera, the height 414 of each camera above the ground or above any other known surface, and the distance 416 of each camera from one or more known positions. In one embodiment, during calibration, an object of known dimensions in placed in a stationary position a known distance from each camera and one or more images of the object are generated. The term known dimensions refers to known shapes of portions of the object and known measurements of the object, such as but without limitation, height, length, width, radius, area, volume, and/or weight. The object is then moved to a different location a known distance from each camera and one or more images of the object are generated. This process is continued until images of the object at various known distances from each camera are generated. In another embodiment, the object may be capable of motion, such as a vehicle or a person. In such a case, the object is moved slowly along a predetermined track or course in a given area within recording range of the set of cameras while the cameras generate images of the object. In another embodiment, two or more objects of varying known sizes may be used during calibration. This calibration data, generated by using known objects of known dimensions at known distances from each camera, is used to extrapolate the location, distance, size, and shape of unknown objects in the images.

FIG. 5 is a block diagram of color and texture attributes generated based on results of processing digital video data in accordance with an illustrative embodiment. Color and texture attributes 500 are video based attributes associated with a set of one or more objects. Color and texture attributes 500 may include, without limitation, color 502, properties of color 504, combination of colors 506, shade 508, texture 510, and/or identification markings 512.

Color 502 is an attribute that identifies the color of a portion of a surface of an object. Color 502 may be an attribute identifying either a spectral color or a non-spectral color. A spectral color is a color that can be produced by visible light of a single wavelength only. Spectral colors may also be referred to as monochromatic colors. A non-spectral color is a color that is produced by a mixture of various wavelengths of light. Properties of color 504 include properties such as but without limitation, hue, saturation, and brightness. Hue refers to tint, gradations, or variety of color. Hues may be primary, secondary, or tertiary hues. Brightness refers to the luminescence of an object and indicates whether a source appears to emit or reflect a given amount of light.

Combination of colors 506 is an attribute that identifies patterns of two or more colors associated with an object. A pattern of colors may be a pattern of two or more different colors or a pattern of two or more different tones of the same color, such as in a two-tone automobile. Shade 508 identifies light and shadow falling on an object that may alter the appearance of the color of an object. For example, if a solid red car is partially in the sun and partially in the shade, the car may appear to be a two tone car when in fact the car is a uniform red color. Thus, shade 508 identifies light sources and shadows falling on an object.

Texture 510 is an attribute that identifies whether a portion of a surface of an object is rough/coarse or smooth. Identification markings 512 identify markings on the surface of an object, such as letters, numbers, punctuation marks, symbols, and other markings. Identification markings 512 may be found on name tags, identification badges, license plates, bumper stickers, logos, trademarks, labels, serial numbers, and/or signs.

Color and texture attributes 500 are not limited to the attributes shown in FIG. 5. Color and texture attributes 500 may include additional attributes describing the appearance of an object in an image, such as, without limitation, lightness, chroma, purity, and intensity.

Figure 6:
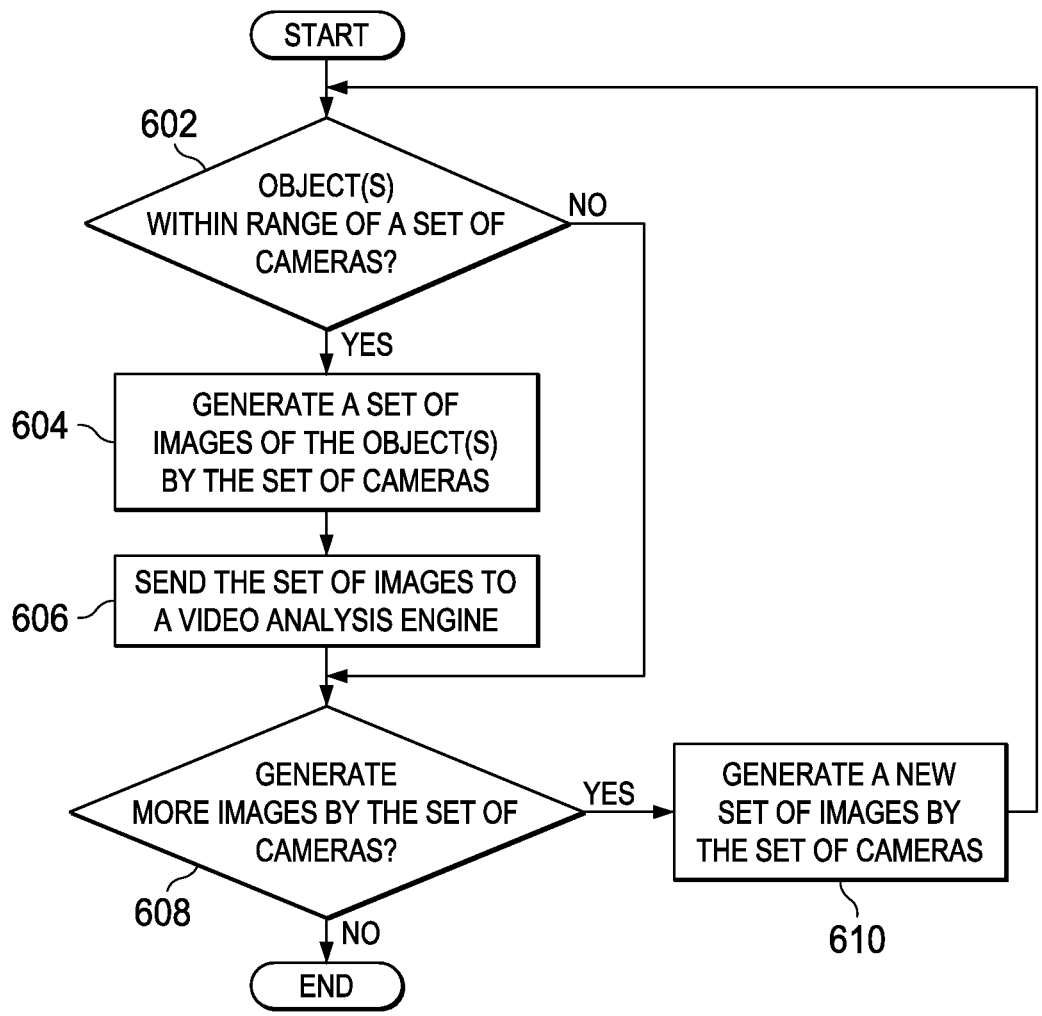
FIG. 6 is a flowchart of a process for capturing camera images in accordance with an illustrative embodiment.

FIG. 6 is a flowchart of a process for capturing camera images in accordance with an illustrative embodiment. The process in FIG. 6 may be implemented by a set of one or more cameras, such as set of cameras 302 in FIG. 3.

The process begins by making a determination as to whether any objects are in range of a set of cameras (step 602). An object is in range of a camera if the camera is able to record images of the object or a portion of the object. If any objects are in range of the set of cameras, a set of images of the object(s) by the set of cameras are generated (step 604). The set of images are sent to a video analysis engine (step 606), such as, without limitation, video analysis engine 306 in FIG. 3.

Returning to step 602, if no objects are in range or after the images are sent to a video analysis engine in step 606, a determination is made as to whether to generate more images of one or more objects by the set of cameras (step 608). If more images are not generated, the process terminates.

Returning to step 608, if a determination is made to generate more images, the set of cameras generates a new set of images (step 610). The set of cameras implements steps 602-610 iteratively until no new images are generated at step 608 and the process terminates.

Turning now to FIG. 7, a flowchart of a process for generating video based cohorts using color and texture attributes is shown in accordance with an illustrative embodiment. The process in FIG. 7 may be implemented by software for processing video sensory input, such as video analysis engine 306 in FIG. 3. Step 708 and 710 may be implemented by software for generating video cohorts based on digital video data, such as cohort generation engine 314 in FIG. 3.

The process begins by receiving video images from a set of cameras (step 702). The video analysis engine processes and parses the images to form digital video data with metadata describing colors and textures of objects captured in the video images (step 704). The metadata is generated using any known or available method and/or software tools, such as, without limitation, IBM® smart surveillance system (S3) software, color identification software, optical character recognition software, and/or license plate recognition software.

The video analysis engine processes the digital video data to identify a set of color and texture attributes associated with a set of objects shown in the video images (step 706). A cohort generation engine analyzes the set of color and texture attributes using at least one cohort criteria and/or cohort constraints (step 708). In another embodiment, the cohort generation engine may optionally use color patterns and/or a set of data models to analyze the attributes. The cohort generation engine generates a set of cohorts based on the results of analyzing the color and texture attributes (step 710) with the process terminating thereafter. In another embodiment, the cohort generation engine optionally utilizes data models and/or identified video patterns in addition to cohort criteria or instead of cohort criteria to create the set of video cohorts.

Thus, according to one embodiment of the present invention, a computer implemented method, apparatus, and computer program product for generating video based cohorts is provided. A digital video analysis engine processes digital video data to identify a set of color and texture based attributes associated with the set of objects. The digital video data comprises metadata describing the set of objects. A cohort generation engine analyzes the set of color and texture based attributes using cohort criteria to form a result. The cohort criteria specify attributes that are associated with members of a given cohort. The cohort generation engine generates a set of cohorts based on the result. Each cohort in the set of cohorts comprises a subset of objects from the set of objects that share at least one color and texture based attribute in common.

The video cohorts may be used, for example and without limitation, in sales, marketing, marketing research, medical and diagnostic research, public health, demographic research, marketing trends, safety and/or security. The video cohorts may also be used for quality control in the food industry, in pharmaceuticals, manufacturing, diagnostics, and other areas.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating and utilizing video based cohorts, the computer implemented method comprising:

processing digital video data, by a video analysis engine, to identify a set of color attributes and texture based attributes associated with clothing worn by a set of objects, wherein the set of objects are persons wearing an item of clothing manufactured by a specific manufacturer, wherein the digital video data comprises metadata describing the set of objects, wherein the texture based attributes describe whether the item of clothing is smooth or rough, wherein the item of clothing is a particular color, and wherein the digital video data comprises video images of the set of objects that are captured by a plurality of cameras;

adjusting colors of the video images by identifying light sources that illuminate the set of objects and shadows that fall on the set of objects, wherein the light sources and the shadows have been predetermined to alter true colors of a corporate logo that is affixed to the item of clothing, wherein said adjusting colors returns an image of the corporate logo to its true colors, and wherein the corporate logo identifies the specific manufacturer of the item of clothing being worn by the persons whose images are captured by the plurality of cameras;

analyzing the set of color and texture based attributes using cohort criteria to identify the item of clothing and the corporate logo captured by the plurality of cameras;

generating and storing a set of video based cohorts, wherein each cohort in the set of video based cohorts comprises a subset of objects, from the set of objects, that share at least one color and texture based attribute; and predicting, by an inference engine, whether the item of clothing being worn by the persons viewed by the plurality of cameras and by persons from a cohort from the set of video based cohorts, will increase in popularity in a particular geographic region based on how many persons of a predetermined age group are viewed, by the plurality of cameras, while wearing a copy of the item of clothing.

2. The computer implemented method of claim 1, wherein the set of color and texture based attributes comprises an identification of a color of a portion of clothing worn by an object in the set of objects.

3. The computer implemented method of claim 1, wherein the set of color and texture based attributes comprises properties of a color associated with a portion of clothing worn by an object in the set of objects.

4. The computer implemented method of claim 1, wherein the set of color and texture based attributes comprises an identification of a pattern of colors associated with clothing worn by an object in the set of objects.

5. The computer implemented method of claim 1, wherein the set of color and texture based attributes comprises an identification of a texture associated with a portion of a surface of clothing worn by an object in the set of objects.

6. The computer implemented method of claim 1, further comprising:

receiving the set of video based cohorts by an inference engine; and processing the set of video based cohorts by the inference engine, wherein the inference engine uses the set of video based cohorts to generate a set of inferences, and wherein the set of inferences identifies a predicted future activity by members described by the set of video based cohorts.

7. A computer program product for generating video cohort data, the computer program product comprising:

a computer readable storage device having computer usable program code embodied therewith, the computer usable program code comprising:

computer usable program code to process digital video data, by a video analysis engine, to identify a set of color attributes and texture based attributes associated with clothing worn by a set of objects, wherein the set of objects is persons wearing an item of clothing manufactured by a specific manufacturer, wherein the digital video data comprises metadata describing the set of objects, wherein the texture based attributes describe whether the item of clothing is smooth or rough, and wherein the digital video data comprises video images, of the set of objects, that are captured by a plurality of cameras;

computer usable program code to adjust colors of the video images by identifying light sources that illuminate the set of objects and shadows that fall on the set of objects, wherein the light sources and the shadows have been predetermined to alter true colors of a corporate logo that is affixed to the item of clothing, wherein adjusting said colors returns an image of the corporate logo to its true colors, and wherein the corporate logo identifies the specific manufacturer of the item of clothing being worn by persons whose images are captured by the plurality of cameras;

computer usable program code to analyze the set of color attributes and texture based attributes using cohort criteria to identify the item of clothing and the corporate logo captured by the plurality of cameras;

computer usable program code to generate and store a set of video based cohorts based on the result, wherein each cohort in the set of video based cohorts comprises a subset of objects, from the set of objects, that share at least one color attribute and one texture based attribute; and computer usable program code to predict whether the item of clothing being worn by the persons and members of a cohort from the set of video based cohorts, will increase in popularity in a particular geographic region based on how many persons are viewed, by the plurality of cameras, while wearing a copy of the item of clothing.

8. The computer program product of claim 7, wherein the set of color and texture based attributes comprises an identification of a color of a portion of clothing worn by an object in the set of objects.

9. The computer program product of claim 7, wherein the set of color and texture based attributes comprises properties of a color associated with a portion of clothing worn by an object in the set of objects.

10. The computer program product of claim 7, wherein the set of color and texture based attributes comprises an identification of a pattern of colors associated with a portion of clothing worn by an object in the set of objects.

11. The computer program product of claim 7, wherein the set of color and texture based attributes comprises an identification of a texture associated with a portion of a surface of clothing worn by an object in the set of objects.

12. The computer program product of claim 7, further comprising:

computer usable program code to receive the set of video based cohorts by an inference engine; and computer usable program code to process the set of video based cohorts by the inference engine, wherein the inference engine uses the set of video based cohorts to generate a set of inferences.

13. An apparatus comprising:

a bus system;

a communications system coupled to the bus system;

a memory connected to the bus system, wherein the memory includes computer usable program code; and a processing unit coupled to the bus system, wherein the processing unit executes the computer usable program code to process digital video data, by a video analysis engine, to identify a set of color attributes and texture based attributes associated with clothing worn by a set of objects, wherein the set of objects are persons wearing an item of clothing manufactured by a specific manufacturer, wherein the digital video data comprises metadata describing the set of objects, wherein the texture based attributes describe whether the item of clothing is smooth or rough, and wherein the digital video data comprises video images of the set of objects that are captured by a plurality of cameras; adjust colors of the video images by identifying light sources that illuminate the set of objects and shadows that fall on the set of objects, wherein the light sources and the shadows have been predetermined to alter true colors of a corporate logo that is affixed to the item of clothing, wherein adjusting said colors returns an image of the corporate logo to its true colors, and wherein the corporate logo identifies the specific manufacturer of the item of clothing being worn by the persons whose images are captured by the plurality of cameras; analyze the set of color attributes and texture based attributes using cohort criteria to identify the item of clothing and the corporate logo captured by the plurality of cameras; generate and store a set of video based cohorts based on the result, wherein each cohort in the set of video based cohorts comprises a subset of objects, from the set of objects, that share at least one color attribute and texture based attribute; and predict whether the item of clothing being worn by the persons and members of a cohort from the set of video based cohorts, will increase in popularity in a particular geographic region based on how many persons are viewed, by the plurality of cameras, while wearing a copy of the item of clothing.

14. The apparatus of 13, wherein the processing unit executes the computer usable program code to receive the set of video based cohorts by an inference engine and process the set of video based cohorts by the inference engine, wherein the inference engine uses the set of video based cohorts to generate a set of inferences.

* * * * *